(12) United States Patent
DiBenedetto et al.

(10) Patent No.: US 11,293,298 B2
(45) Date of Patent: Apr. 5, 2022

(54) HEAT TRANSFER COEFFICIENTS IN A COMPRESSOR CASE FOR IMPROVED TIP CLEARANCE CONTROL SYSTEM

(71) Applicant: United Technologies Corporation, Farmington, CT (US)

(72) Inventors: Enzo DiBenedetto, Berlin, CT (US); Paul E. Coderre, East Hampton, CT (US); Horacio Antonio Altagracia, Isabela, PR (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/704,642

(22) Filed: Dec. 5, 2019

(65) Prior Publication Data

US 2021/0172332 A1     Jun. 10, 2021

(51) Int. Cl.
*F01D 11/24*     (2006.01)
*F01D 25/12*     (2006.01)
*F04D 29/52*     (2006.01)
*F04D 29/54*     (2006.01)

(52) U.S. Cl.
CPC .............. *F01D 11/24* (2013.01); *F01D 25/12* (2013.01); *F04D 29/526* (2013.01); *F04D 29/542* (2013.01); *F05D 2220/323* (2013.01); *F05D 2240/35* (2013.01); *F05D 2260/20* (2013.01); *F05D 2270/303* (2013.01); *F05D 2270/3062* (2013.01)

(58) Field of Classification Search
CPC .... F01D 11/22; F01D 11/24; F05D 2220/323; F05D 2240/35; F05D 2240/11; F05D 2260/20; F05D 2260/201; F05D 2270/303; F05D 2270/3062
See application file for complete search history.

(56) References Cited

U.S. PATENT DOCUMENTS

| | | | |
|---|---|---|---|
| 4,036,020 A * | 7/1977 | Bagley | F01D 9/02 376/391 |
| 4,329,114 A | 5/1982 | Johnston et al. | |
| 4,644,974 A * | 2/1987 | Zingg | B24C 5/04 138/44 |
| 4,683,716 A | 8/1987 | Wright et al. | |
| 5,351,732 A | 10/1994 | Mills et al. | |

(Continued)

FOREIGN PATENT DOCUMENTS

| | | | |
|---|---|---|---|
| CA | 2948978 A1 * | 6/2017 | ............... B28B 3/12 |
| WO | 2013184336 A1 | 12/2013 | |

OTHER PUBLICATIONS

EP Search Report dated Mar. 26, 2021 issued for corresponding European Patent Application No. 20212251.1.

*Primary Examiner* — Courtney D Heinle
*Assistant Examiner* — Ryan C Clark
(74) *Attorney, Agent, or Firm* — Bachman & LaPointe, P.C.

(57) ABSTRACT

A compressor case to blade tip clearance system comprising a rotor having blades with tips, the case including an inner case comprising at least one surface feature fluidly coupled to a distribution manifold disposed in a cooling air passageway, the at least one surface feature configured to interact with the cooling air, and a tip clearance located between the tips and the inner case; wherein the tip clearance is maintained responsive to a flow of the cooling air over the at least one surface feature.

13 Claims, 2 Drawing Sheets

(56) References Cited

U.S. PATENT DOCUMENTS

| | | | |
|---|---|---|---|
| 6,511,284 B2 | 1/2003 | Darnell et al. | |
| 7,114,914 B2 | 10/2006 | Gendraud et al. | |
| 7,431,557 B2* | 10/2008 | Herron | F01D 11/24 |
| | | | 415/1 |
| 7,503,179 B2* | 3/2009 | Estridge | F01D 11/24 |
| | | | 60/782 |
| 7,597,537 B2* | 10/2009 | Bucaro | F01D 11/24 |
| | | | 415/136 |
| 8,126,628 B2* | 2/2012 | Hershey | F01D 11/24 |
| | | | 701/100 |
| 8,317,465 B2 | 11/2012 | Smith | |
| 8,403,637 B2 | 3/2013 | Kirby | |
| 8,973,373 B2* | 3/2015 | Arar | F02C 9/18 |
| | | | 60/785 |
| 9,644,490 B2 | 5/2017 | Joe et al. | |
| 10,087,772 B2* | 10/2018 | Sun | F04D 29/526 |
| 10,746,048 B2* | 8/2020 | Lefebvre | F01D 25/246 |
| 2005/0276690 A1* | 12/2005 | Amiot | F01D 11/24 |
| | | | 415/178 |
| 2006/0005529 A1* | 1/2006 | Penda | F01D 11/22 |
| | | | 60/226.1 |
| 2010/0178152 A1* | 7/2010 | Tillery | F01D 11/24 |
| | | | 415/1 |
| 2010/0202878 A1* | 8/2010 | Wacker | F01D 9/026 |
| | | | 415/208.1 |
| 2012/0167588 A1 | 7/2012 | Dierksmeier et al. | |
| 2013/0149123 A1* | 6/2013 | Laurello | F01D 11/24 |
| | | | 415/191 |
| 2013/0266418 A1* | 10/2013 | Snook | F01D 11/24 |
| | | | 415/1 |
| 2016/0169027 A1* | 6/2016 | Jones | F01D 25/12 |
| | | | 415/116 |
| 2018/0030987 A1* | 2/2018 | Clarke | F04D 27/0246 |
| 2018/0298758 A1 | 10/2018 | Cunningham | |
| 2019/0078458 A1* | 3/2019 | Eastwood | F01D 11/24 |
| 2019/0078459 A1* | 3/2019 | Eastwood | F01D 11/24 |
| 2019/0136708 A1* | 5/2019 | Sebastian | F01D 11/24 |
| 2019/0189297 A1* | 6/2019 | Melito | G21C 13/022 |

* cited by examiner

HEAT TRANSFER COEFFICIENTS IN A COMPRESSOR CASE FOR IMPROVED TIP CLEARANCE CONTROL SYSTEM

BACKGROUND

The present disclosure is directed to a compressor case configured for improved tip clearance. Particularly, configuring case components to control flow velocities of cooling air and modifying surface features of the components to enhance heat transfer.

Gas turbine engines provide power by compressing air using a compressor, adding fuel to this compressed air, combusting this mixture such that it expands through the blades of a turbine and exhausting the produced gases. The turbine consists of a disc, rotating about the central shaft of the engine, and a plurality of blades extending radially out of the disc towards the engine casing of the engine. Expansion of the combustion gases through the turbine causes its blades to rotate at high speed and the turbine, in turn, drives the compressor.

The distance between the tips of the blades and the inner surface of the compressor casing is known as the tip clearance. It is desirable for the tips of the blades to rotate as close to the casing without rubbing as possible because as the tip clearance increases, a portion of the compressed gas flow will pass through the tip clearance decreasing the efficiency of the compressor. This is known as over-tip leakage. The efficiency of the compressor, which partially depends upon tip clearance, directly affects the specific fuel consumption (SFC) of the engine. Accordingly, as tip clearance increases, SFC also rises.

As the disc and the blades rotate, centrifugal and thermal loads cause the disc and blades to extend in the radial direction. The casing also expands as it is heated but there is typically a mismatch in radial expansion between the disc/blades and the casing. Specifically, the blades will normally expand radially more quickly than the housing, reducing the tip clearance and potentially leading to "rubbing" as the tips of blade come into contact with the interior of the casing. Over time in use, the casing heats up and expands away from the blade tip, increasing the tip clearance. This may result in a tip clearance at stabilized cruise conditions that is larger than desired resulting in poor efficiency.

Conventionally, tip clearances are set when the engine is cold to allow for radial extension of the disc and blades due to centrifugal and thermal loads, to prevent rubbing. This means that there is initially a large tip clearance, such that the engine is relatively inefficient. When the engine is running, the blades will eventually extend radially to close this clearance, making the engine run more efficiently. Over a longer period of time, however, the temperature of the casing will rise and the casing will expand radially, which will again increase the tip clearance.

The running tip clearance of the high-pressure compressor (HPC) of an aircraft engine has a significant bearing on the efficiency of the HPC module. This, in turn, impacts other module attributes such as turbine durability as well as the engine fuel burn metric. Consequently much effort has been expended in ensuring that the running tip clearance is at the smallest mechanically feasible value.

SUMMARY

In accordance with the present disclosure, there is provided a compressor case to blade tip clearance system comprising a rotor having blades with tips, the case including an inner case comprising at least one surface feature fluidly coupled to a distribution manifold disposed in a cooling air passageway, said at least one surface feature configured to interact with the cooling air, and a tip clearance located between the tips and the inner case; wherein said tip clearance is maintained responsive to a flow of the cooling air over said at least one surface feature.

In another and alternative embodiment, the air is directed to cool the inner case comprising the at least one surface feature and cause a contraction of the inner case and reduce the tip clearance.

In another and alternative embodiment, the compressor case to blade tip clearance system further comprises a collection manifold fluidly coupled to the distribution manifold fluidly coupled to the inner case comprising the at least one surface feature.

In another and alternative embodiment, the compressor case to blade tip clearance system further comprises a valve fluidly coupled between the collection manifold and the distribution manifold, the valve configured to control the flow of cooling air over the at least one surface feature.

In another and alternative embodiment, the compressor case to blade tip clearance system further comprises a controller coupled to the valve, the controller configured to actuate the valve to control the air flow rate to change the tip clearance by changing the temperature of the case.

In another and alternative embodiment, the at least one surface feature is selected from the group consisting of a trip strip, a ridge, a nub, raised and dimpled contours and the like.

In another and alternative embodiment, the at least one surface feature configured as a ring configured to produce a symmetric response to the case.

In accordance with the present disclosure, there is provided a gas turbine engine compressor having a tip clearance control system comprising an inner case having a cooling air passageway configured to direct cooling air through the compressor; at least one surface feature formed in a surface of a component in the inner case, the at least one surface feature configured to contact the cooling air; at least one blade having a blade tip; the tip clearance located between the inner case and the blade tip; and a collection manifold fluidly coupled to a distribution manifold fluidly coupled to the cooling air passageway of the inner case comprising the at least one surface feature, wherein the collection manifold and the distribution manifold are configured to direct the cooling air to the at least one surface feature to manage the tip clearance.

In another and alternative embodiment, the gas turbine engine compressor further comprises a valve fluidly coupled between the collection manifold and the distribution manifold, the valve configured to control the cooling air over the at least one surface feature.

In another and alternative embodiment, the distribution manifold is selected from the group consisting of a nozzle and a diffuser.

In another and alternative embodiment, the gas turbine engine compressor further comprises a controller coupled to the valve, the controller configured to actuate the valve to control the cooling air flow velocity to change the tip clearance by changing the temperature of the at least one surface feature; and instrumentation and controls coupled to the controller the instrumentation and controls configured to activate the controller responsive to gas turbine engine information.

In another and alternative embodiment, the gas turbine engine compressor further comprises an insert coupled to the distribution manifold, the insert selected from the group consisting of a convergent passageway, a divergent passageway, a nozzle and a diffuser.

In another and alternative embodiment, the at least one surface feature is configured to interrupt lamellar flow boundaries along a surface of the cooling air passageway and cause mixing of the cooling air.

In accordance with the present disclosure, there is provided a process for maintaining a tip clearance of a compressor by use of a tip clearance control system comprising configuring at least a portion of an inner case of the compressor with at least one surface feature; at least one compressor blade having a blade tip; the tip clearance located between the inner case and the blade tip; fluidly coupling a collection manifold to a distribution manifold within the compressor; fluidly coupling the distribution manifold to the inner case comprising the at least one surface feature; directing cooling air from the collection manifold to the distribution manifold to the at least one surface feature; and changing the tip clearance responsive to heat transfer between the case proximate the at least one surface feature and the cooling air.

In another and alternative embodiment, the air cools the at least one surface feature.

In another and alternative embodiment, the process further comprises fluidly coupling a valve between the collection manifold and the distribution manifold, controlling the valve to control the cooling air directed to the at least one surface feature; and utilizing the distribution manifold to at least one of increase the cooling air velocity or decrease the cooling air velocity proximate the at least one surface feature.

In another and alternative embodiment, the process further comprises coupling a controller to the valve, configuring the controller to actuate the valve to control the cooling air flow rate to change the tip clearance by changing the temperature of the casing proximate the at least one surface feature.

In another and alternative embodiment, the process further comprises coupling instrumentation and controls to the controller; configuring the instrumentation and controls to activate the controller responsive to gas turbine engine information.

In another and alternative embodiment, the process further comprises installing an insert proximate the at least one surface feature; modifying the velocity of the cooling air proximate the at least one surface feature with the insert configured as at least one of convergent flow area or divergent flow area.

Other details of the compressor case/tip clearance control system are set forth in the following detailed description and the accompanying drawings wherein like reference numerals depict like elements.

DETAILED DESCRIPTION

Figure 1:
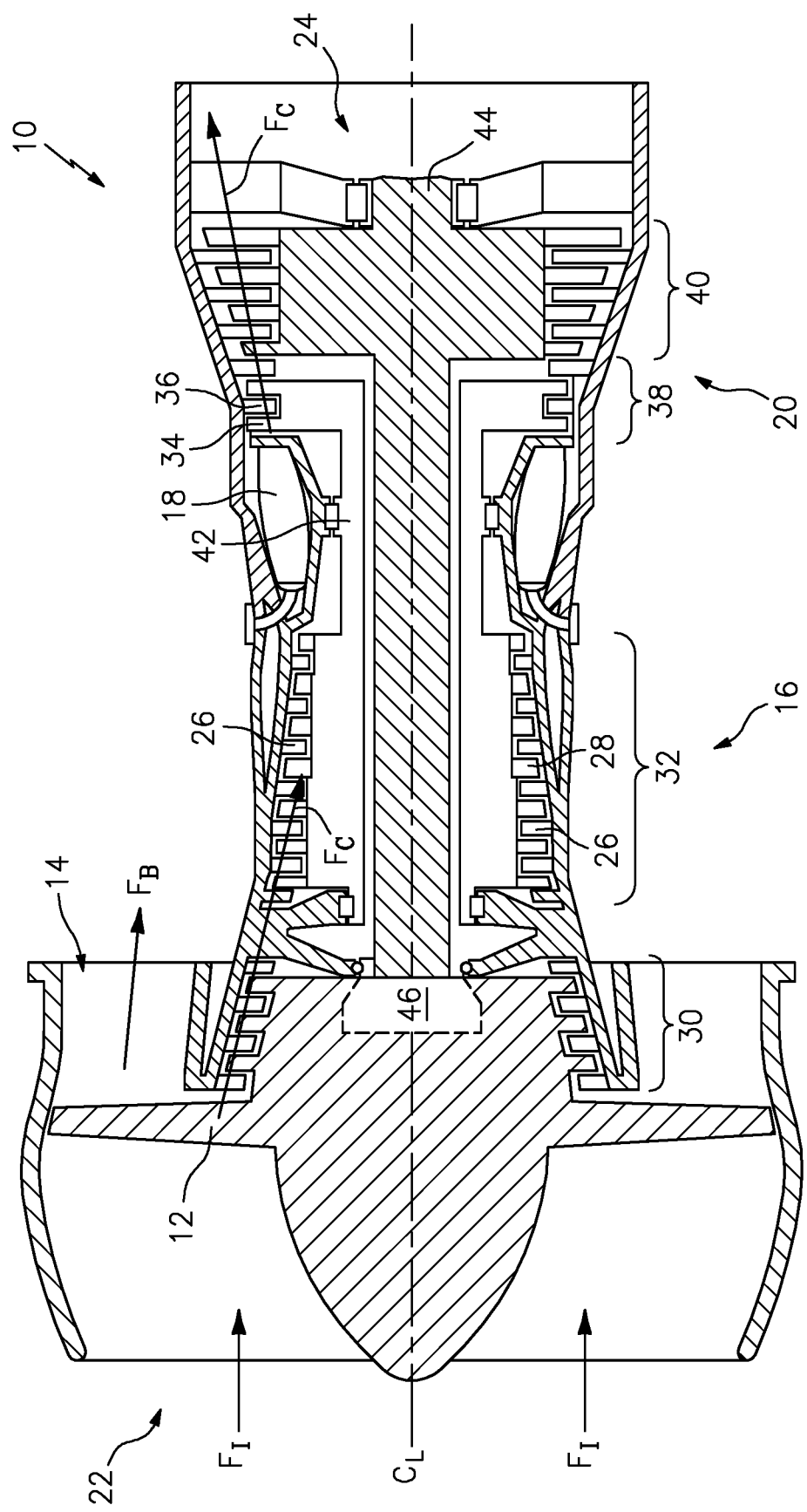
FIG. 1 is a simplified cross-sectional view of a gas turbine engine.

FIG. 1 is a simplified cross-sectional view of a gas turbine engine 10 in accordance with embodiments of the present disclosure. Turbine engine 10 includes fan 12 positioned in bypass duct 14. Turbine engine 10 also includes compressor section 16, combustor (or combustors) 18, and turbine section 20 arranged in a flow series with upstream inlet 22 and downstream exhaust 24. During the operation of turbine engine 10, incoming airflow $F_1$ enters inlet 22 and divides into core flow $F_c$ and bypass flow $F_B$, downstream of fan 12. Core flow $F_c$ continues along the core flowpath through compressor section 16, combustor 18, and turbine section 20, and bypass flow $F_B$ proceeds along the bypass flowpath through bypass duct 14.

Compressor 16 includes stages of compressor vanes 26 and blades 28 arranged in low pressure compressor (LPC) section 30 and high pressure compressor (HPC) section 32. Turbine section 20 includes stages of turbine vanes 34 and turbine blades 36 arranged in high pressure turbine (HPT) section 38 and low pressure turbine (LPT) section 40. HPT section 38 is coupled to HPC section 32 via HPT shaft 42, forming the high pressure spool. LPT section 40 is coupled to LPC section 30 and fan 12 via LPT shaft 44, forming the low pressure spool. HPT shaft 42 and LPT shaft 44 are typically coaxially mounted, with the high and low pressure spools independently rotating about turbine axis (centerline) $C_L$.

Combustion gas exits combustor 18 and enters HPT section 38 of turbine 20, encountering turbine vanes 34 and turbines blades 36. Turbine vanes 34 turn and accelerate the flow of combustion gas, and turbine blades 36 generate lift for conversion to rotational energy via HPT shaft 42, driving HPC section 32 of compressor 16. Partially expanded combustion gas flows from HPT section 38 to LPT section 40, driving LPC section 30 and fan 12 via LPT shaft 44. Exhaust flow exits LPT section 40 and turbine engine 10 via exhaust nozzle 24. In this manner, the thermodynamic efficiency of turbine engine 10 is tied to the overall pressure ratio (OPR), as defined between the delivery pressure at inlet 22 and the compressed air pressure entering combustor 18 from compressor section 16. As discussed above, a higher OPR offers increased efficiency and improved performance. It will be appreciated that various other types of turbine engines can be used in accordance with the embodiments of the present disclosure.

Figure 2:
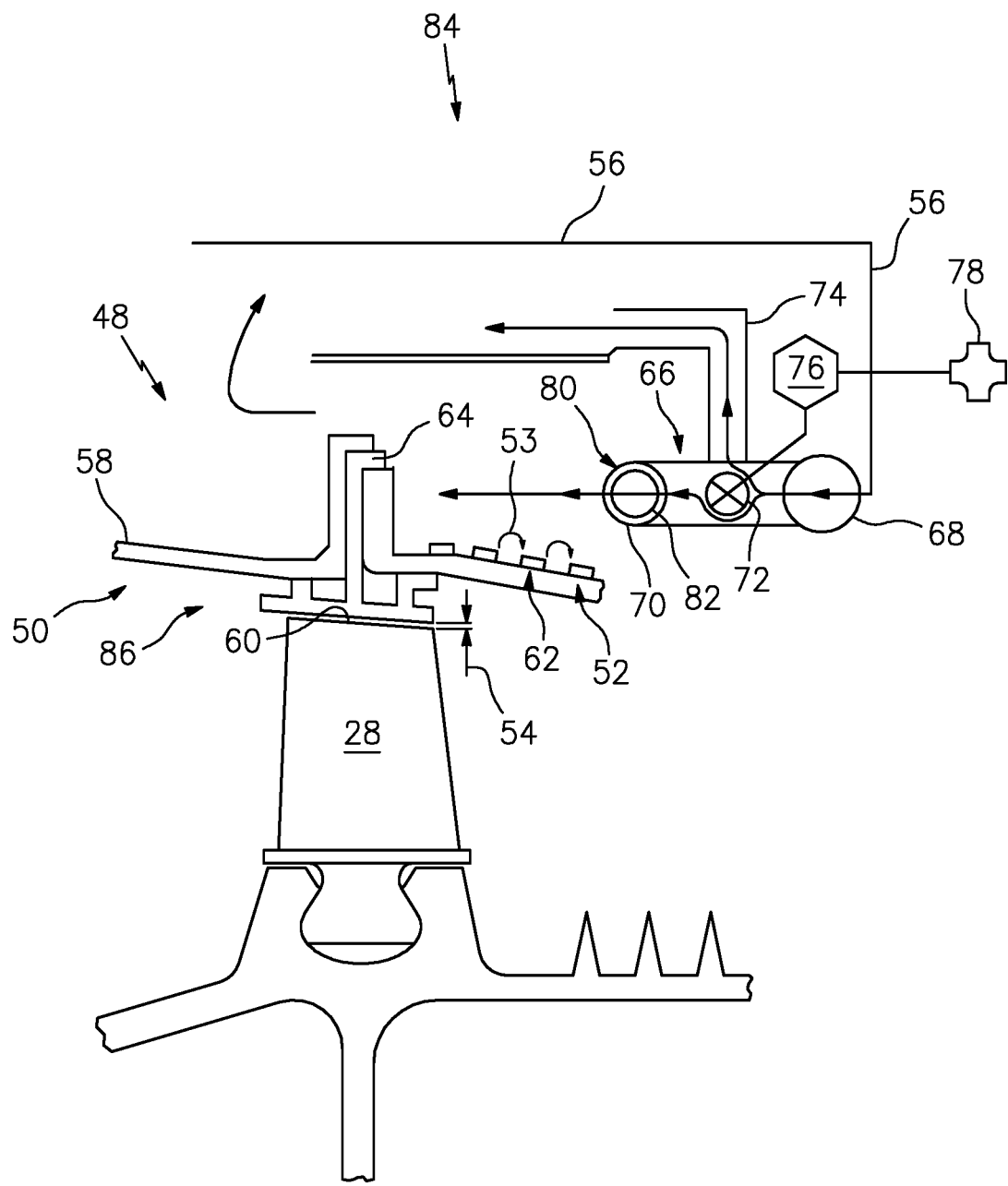
FIG. 2 is a cross sectional view of an exemplary compressor.

Referring to FIG. 2, an exemplary portion of a gas turbine compressor 48 section is shown. The compressor 48 disclosed can achieve a technical effect through a thermal contraction (or inhibit thermal expansion) of the case 50 through the use of air in conjunction with a case architecture featuring surface features 52. In the exemplary embodiment, the inner case 50 proximate the compressor 48 can comprise a surface feature(s) 52. The surface features 52 can be configured to create enhanced heat transfer from the inner case 50 to cooling air 56 flowing over the surface 58 of the inner case 50. Enhanced heat transfer can be considered heat transfer rates that are greater than the heat transfer rate in the absence of the surface feature 52. The surface features 52 can produce vortices 53 in the cooling air that produce convective heat transfer. The surface features 52 can include trip strip, ridges, nubs, raised and dimpled contours, vortex generators, raised flanges, and the like, that are configured to interrupt laminar flow boundaries along the surface 58 and cause mixing of the cooling air 56.

Various portions of the inner case 50 architecture can be employed for the use of the surface features 52. In an exemplary embodiment, portions nearest the rotating blades 28 can be utilized. The portions of the inner case 50 that are configured to maintain the tip clearance 54 between the blade tip 60 and inner case 50 can be configured with the surface features 52. Either axial portions and/or radial portions of the inner case 50 can be employed as well. The surface features 52 can be employed in surfaces of the inner case 50 or components 86 that contact the cooling air 56.

In an exemplary embodiment, the surface feature 52 can be formed as circumferential rings 62 that produce a symmetric response to the case 50. The surface features 52 can be formed into a connector 64 that produces a symmetric response to the case 50. The surface features 52 can be formed as circumferential ribs along an air seal support 86 that produces a symmetric response to the case 50. In an exemplary embodiment the inner case 50 can be configured to experience the cooling effects of the surface features 52 to produce a predetermined blade tip to case clearance 54 change for from about 0% to about 50%. In an exemplary embodiment the predetermined blade tip to case clearance 54 change can be from about 5% to 30% blade cord.

The compressor 48 includes passageways 66 that are used to direct the air 56 through the compressor 48, specifically into the location of the inner case 50 that includes the surface features 52. Compressor 48 cooling air 56, such as, upstream cooling bleed air, can be utilized to change the temperature of the inner case 50 to adjust the case 50 dimensions in order to maintain the proper predetermined tip clearance 54 between the case 50 and blade tip 60. In an exemplary embodiment, a collection manifold 68 can be fluidly coupled to the cooling air 56 to collect the air 56 and direct the cooling air 56 to a distribution manifold 70. The distribution manifold 70 can be configured to fluidly couple the cooling air 56 with the portion of the case 50 that includes the surface features 52. The cooling air 56 can flow over the surface feature 52 and exchange thermal energy to cool the inner case 50. Radial or axial portions of the inner case 50 that are required to control the tip clearance can receive the cooling air 56.

A valve 72 can be fluidly coupled between the collection manifold 68 and the distribution manifold 70. The valve 72 can be positioned to control the flow of cooling air 56. The valve 72 can be adjusted to direct the cooling air 56 toward the distribution manifold 70 or to a bypass manifold 74. The valve 72 can be used to control the temperature of the case 50 and control the tip clearance 54 dimensions between the blade tip 60 and case 50 responsive to the heat transfer enhancement of the surface features 52. In an exemplary embodiment, the temperature differential employed to change the tip clearance 54 can be from about 25 degrees Fahrenheit to about 100 degrees Fahrenheit.

In an exemplary embodiment, a controller 76 can be coupled with the valve 72 and configured to control the valve position. The controller 76 can be a microprocessor and the like, configured to receive input and send output to control the valve 72. The valve 72 can be controlled to maintain/reduce the allocation of the cooling air 56 to the distribution manifold 70 and/or the bypass manifold 74, since the total flow rate of bleed air 56 remains fixed and the valve position determines whether or not it is utilized to effect the thermal contraction of the case 50. The valve 72 is not intended to control the mass flow rate of bleed air 56. That mass flow rate is fixed by the requirement of turbine cooling, which is the intended final destination of bleed air 56.

In an exemplary embodiment, the controller 76 can be utilized to control the cooling air 56 flow direction to change the tip clearance 54 by changing the temperature of the inner case 50. The controller 76 can operate based on a predetermined schedule derived from engine operational data. For example, flight profile, predetermined schedules, and engine conditions can be utilized to modify the cooling air 56 flow and resultant temperature of the case 50 changing the thermal expansion and changing the dimensions of the case 50 relative to the tip 60. In another embodiment, the controller 76 can be operated based on instrumentation and controls 78 coupled to the controller 76 and based on real time information (temperature, dimensions, operational mode) from the gas turbine engine 10. The instrumentation and controls 78 include sensors (temperature, pressure, flow rate, altitude), programs, signals, communications links, engine operational data and the like. The instrumentation and controls 78 sense parameters and characteristics of the gas turbine engine 10 and provide data through signals. In an exemplary embodiment, the cooling air 56 can be directed over the surface features 52 during engine cruise conditions and redirected during engine transient conditions.

The distribution manifold 70 can be configured to be portions of the cooling flow pathway structures in the compressor 48. The distribution manifold 70 can comprise the internal heat shielding baffles situated along the path the cooling air 56 travels. The distribution manifold 70 can be shaped by key placement of supports/baffles 64 and casing surfaces 58 to direct cooling air 56 flow. The distribution manifold can be modified in order to further control the flow of the cooling air 56 proximate the surface features 52. The distribution manifold 70 can be configured, with a portion of a flow area 80 being convergent or divergent, as a nozzle, so as to increase flow velocity, or as a diffuser, so as to decrease flow velocity of the cooling air 56. The distribution manifold 70 can be configured to provide a predetermined cooling air 56 velocity across the surface features 52 as well as maintain air pressure and mass flow rates of the cooling air 56. A technical advantage of configuring the distribution manifold 70 includes the capacity to better control the cooling air 56 velocity and thus the cooling effects on the inner case 50 in coordination with the surface features 52.

In an exemplary embodiment, an insert 82 can be coupled to the distribution manifold 70 and be configured as convergent or divergent, nozzle or diffuser. The insert 82 can change flow parameters proximate the surface features 52. The insert 82 can be placed proximate the surface features 52, upstream or downstream depending on the flow and cooling characteristics needed. The technical advantage of insert 82 can include the capacity to modify a particular inner case 50 design for a predetermined compressor 48 without the need to have to redesign the inner case 50. The insert 82 can have certain flow characteristics that are effective for a particular inner case 50. The insert 82 allows for flow characteristic modifications post construction of the original case 50.

The combination of the surface features 52, cooling air 56 with valve 72 and controller 76 and additional distribution manifold 70 creates an advantageous compressor case/blade tip clearance control system, or simply tip clearance control system 84 configured to enhance the cooling effect across the component 86 being cooled and thus control the tip clearance 54 between the inner case 50 and blade tip 60. In an exemplary embodiment, the portion of the case 50 being cooled can be an air seal support 86.

A technical advantage of the compressor case/blade tip clearance control system incorporated with the case is for better control the tip clearance between the case and the blade tips of the high pressure compressor.

A technical advantage of the compressor case/blade tip clearance control system incorporated within the case includes improving engine cycle performance and maintaining the bleed flow rate, thereby enhancing high pressure compressor life.

Another technical advantage of the compressor case/blade tip clearance control system incorporated within the case includes the capacity to control the flow of air supplied to the case and actively control the tip clearance responsive to gas turbine engine conditions.

Another advantage of the tip clearance control system is that it provides for architectures that enable control of the velocity of case cooling air over circumferential surface features that create vortices in the cooling air proximate the case in order to increase the convective heat transfer coefficient of the component being cooled.

There has been provided a compressor case/blade tip clearance control system. While the compressor case/tip clearance control system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A compressor case to blade tip clearance system comprising:
   a rotor having blades with tips,
   the case including an inner case comprising at least one surface feature fluidly coupled to a distribution manifold disposed in a cooling air passageway, said at least one surface feature configured to interact with the cooling air, and
   a tip clearance located between the tips and the inner case; wherein said tip clearance is maintained responsive to a flow of the cooling air over said at least one surface feature;
   a collection manifold fluidly coupled to the distribution manifold fluidly coupled to said inner case comprising the at least one surface feature;
   a valve fluidly coupled between said collection manifold and said distribution manifold, said valve configured to control said flow of cooling air over said at least one surface feature;
   a controller coupled to said valve, said controller configured to actuate said valve to control the air flow rate to change the tip clearance by changing the temperature of the case;
   instrumentation and controls operatively coupled to the controller, wherein said instrumentation comprises sensors selected from the group consisting of temperature sensor, pressure sensor, flow rate sensor and altitude sensor.

2. The compressor case to blade tip clearance system according to claim 1, wherein said air is directed to cool said inner case comprising the at least one surface feature and cause a contraction of the inner case and reduce the tip clearance.

3. A gas turbine engine compressor having a tip clearance control system comprising:
   an inner case having a cooling air passageway configured to direct cooling air through said compressor;
   at least one surface feature formed in a surface of a component in said inner case, said at least one surface feature configured to contact the cooling air;
   at least one blade having a blade tip;
   the tip clearance located between said inner case and said blade tip;
   a collection manifold fluidly coupled to a distribution manifold fluidly coupled to the cooling air passageway of said inner case comprising the at least one surface feature, wherein said collection manifold and said distribution manifold are configured to direct the cooling air to said at least one surface feature to manage said tip clearance;
   a valve fluidly coupled between said collection manifold and said distribution manifold, said valve configured to control the cooling air over said at least one surface feature;
   a controller coupled to said valve, said controller configured to actuate said valve to control the cooling air flow velocity to change the tip clearance by changing the temperature of the at least one surface feature;
   instrumentation and controls coupled to the controller said instrumentation and controls configured to activate said controller responsive to gas turbine engine information, said gas turbine engine information comprises real time information from the gas turbine engine, said real time information selected from the group consisting of temperature, dimensions and operational mode; and
   an insert coupled to said distribution manifold, said insert selected from the group consisting of a convergent passageway, a divergent passageway, a nozzle and a diffuser.

4. The gas turbine engine compressor according to claim 3, wherein said at least one surface feature is configured to interrupt lamellar flow boundaries along a surface of the cooling air passageway and cause mixing of the cooling air.

5. The gas turbine engine compressor according to claim 3, wherein said distribution manifold is selected from the group consisting of a nozzle and a diffuser.

6. A process for maintaining a tip clearance of a compressor by use of a tip clearance control system comprising:
   configuring at least a portion of an inner case of the compressor with at least one surface feature;
   at least one compressor blade having a blade tip;
   the tip clearance located between said inner case and said blade tip;
   fluidly coupling a collection manifold to a distribution manifold within the compressor;
   fluidly coupling said distribution manifold to said inner case comprising the at least one surface feature;
   directing cooling air from said collection manifold to said distribution manifold to said at least one surface feature; fluidly coupling a valve between said collection manifold and said distribution manifold,
   controlling said valve to control the cooling air directed to said at least one surface feature; and
   utilizing said distribution manifold to at least one of increase the cooling air velocity or decrease the cooling air velocity proximate the at least one surface feature;
   coupling a controller to said valve,
   configuring said controller to actuate said valve to control the cooling air flow rate to change the tip clearance by changing the temperature of the casing proximate the at least one surface feature;
   coupling instrumentation and controls to the controller;
   configuring said instrumentation and controls to activate said controller responsive to gas turbine engine information;
   sensing parameters and characteristics of the gas turbine engine with said instrumentation; and
   changing the tip clearance responsive to heat transfer between said case proximate the at least one surface feature and said cooling air.

7. The process of claim 6, wherein said air cools said at least one surface feature.

8. The process of claim 6, further comprising:
installing an insert proximate said at least one surface feature;
modifying the velocity of the cooling air proximate the at least one surface feature with said insert configured as at least one of convergent flow area or divergent flow area.

9. The process of claim 6, wherein said gas turbine engine information comprises real time information from the gas turbine engine, said real time information selected from the group consisting of temperature, dimensions and operational mode.

10. The process of claim 6, wherein said instrumentation comprises sensors selected from the group consisting of temperature sensor, pressure sensor, flow rate sensor and altitude sensor.

11. The process of claim 6, wherein said controls include at least one of programs, signals, communications links, and engine operational data.

12. The process of claim 6, further comprising:
operating said valve with said controller based on a predetermined schedule derived from engine operational data.

13. The compressor case to blade tip clearance system according to claim 1, wherein said controller is configured to operate said valve based on a predetermined schedule derived from engine operational data.

* * * * *